Jan. 25, 1966   R. R. CAMPBELL   3,230,850
CAMERA WITH SELECTIVE ACTUATING MECHANISM
Filed Jan. 28, 1963   2 Sheets-Sheet 1
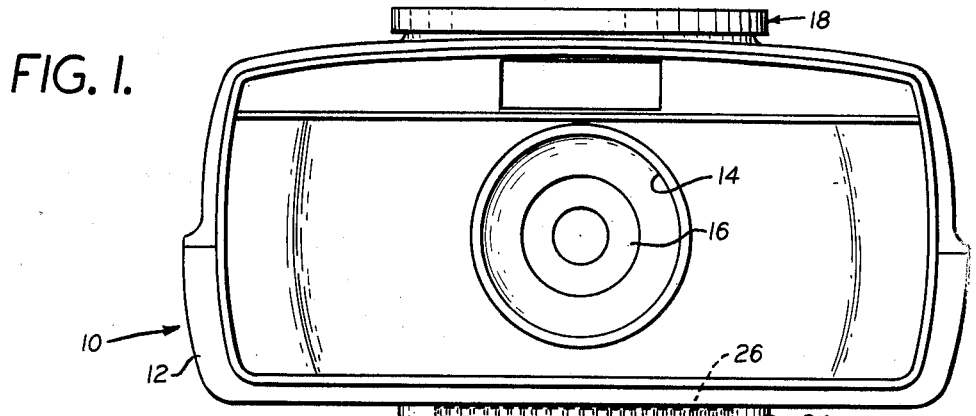
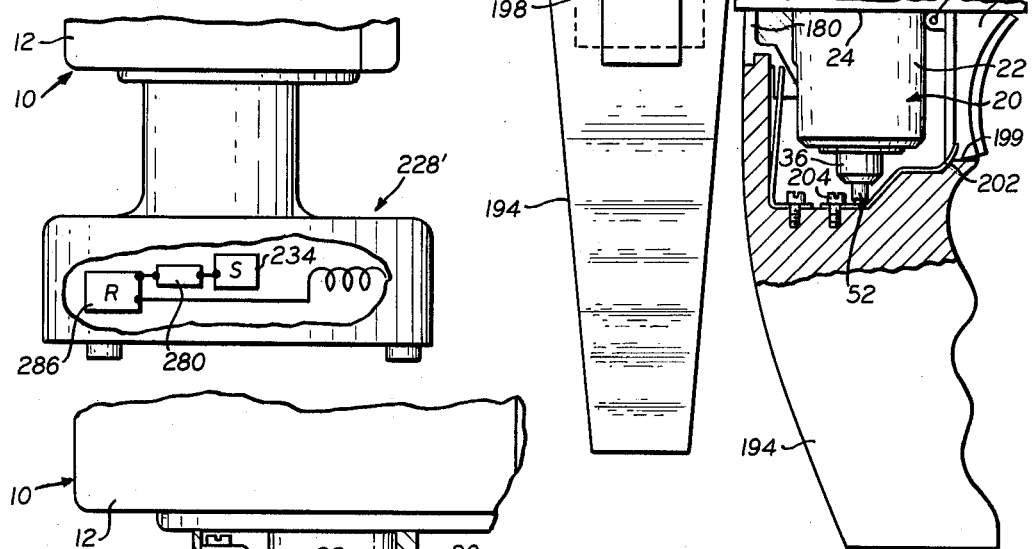
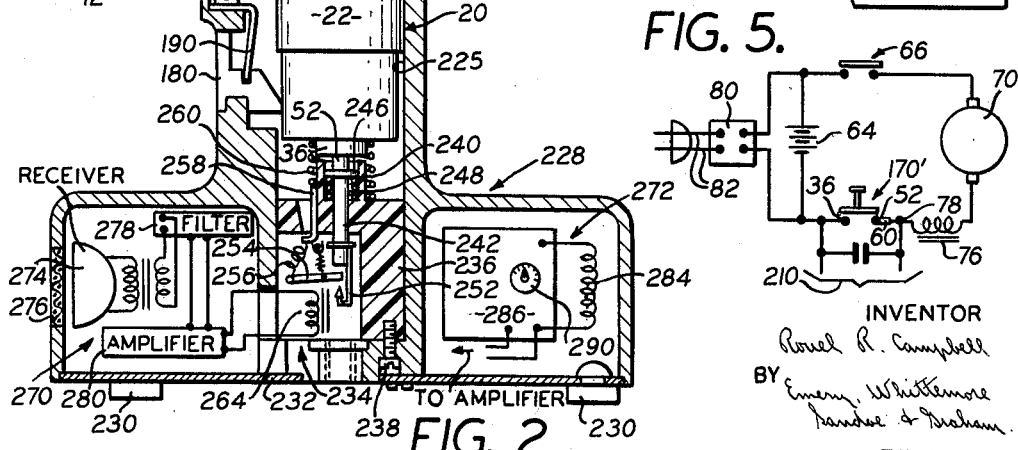
INVENTOR
Rowel R. Campbell
BY Emery, Whittemore
Sandoe & Graham
ATTORNEYS.

United States Patent Office 3,230,850
Patented Jan. 25, 1966

3,230,850
CAMERA WITH SELECTIVE ACTUATING
MECHANISM
Rouel R. Campbell, Canoga Park, Calif., assignor, by mesne assignments, to Bank of America National Trust and Savings Association
Filed Jan. 28, 1963, Ser. No. 254,113
9 Claims. (Cl. 95—15)

This invention relates to cameras and more especially to panoramic cameras. The invention is concerned with means for actuating the camera to take a picture. It is an object of the invention to provide a camera, and especially a panoramic camera, with different means for actuating it, and to construct the camera so that it can be connected and disconnected conveniently with different bases for holding the various actuating means. In the preferred construction, the camera is made so that it can be operated manually, by an automatic timer, in response to a signal by radio or other radiant energy, and in response to a sound signal within a given frequency range.

It is another object of the invention to provide a panoramic camera, of the character indicated, with a stationary base for supporting the camera from a table, tripod or other support, and with means for causing the camera to rotate about a vertical axis in response to the actuation by the timer, radiant controller or sonic controller.

Other objects, features and advantages of the invention will appear or be pointed out as the description proceeds.

In the drawing, forming a part hereof, in which like reference characters indicate corresponding parts in all the views:

FIGURE 1 is a front view of a panoramic camera having a support and a handle to which the support is connected, the support being shown partly in section and the handle and its connections with the support being shown in sections;

FIGURE 1a is a view, partly in section, showing the construction of the pistol grip handle illustrated in FIGURE 1, the section being taken on the line 1a—1a of FIGURE 1;

FIGURE 2 is a fragmentary, diagrammatic view, showing a panoramic camera mounted in a base having sonic and radiant energy control means for actuating the camera;

FIGURE 3 is a diagrammatic view, partly broken away, showing a base similar to that of FIGURE 2 but with the camera controlled only by radiant energy;

FIGURE 5 is a wiring diagram for the invention shown in the other figures.

Figure 4:
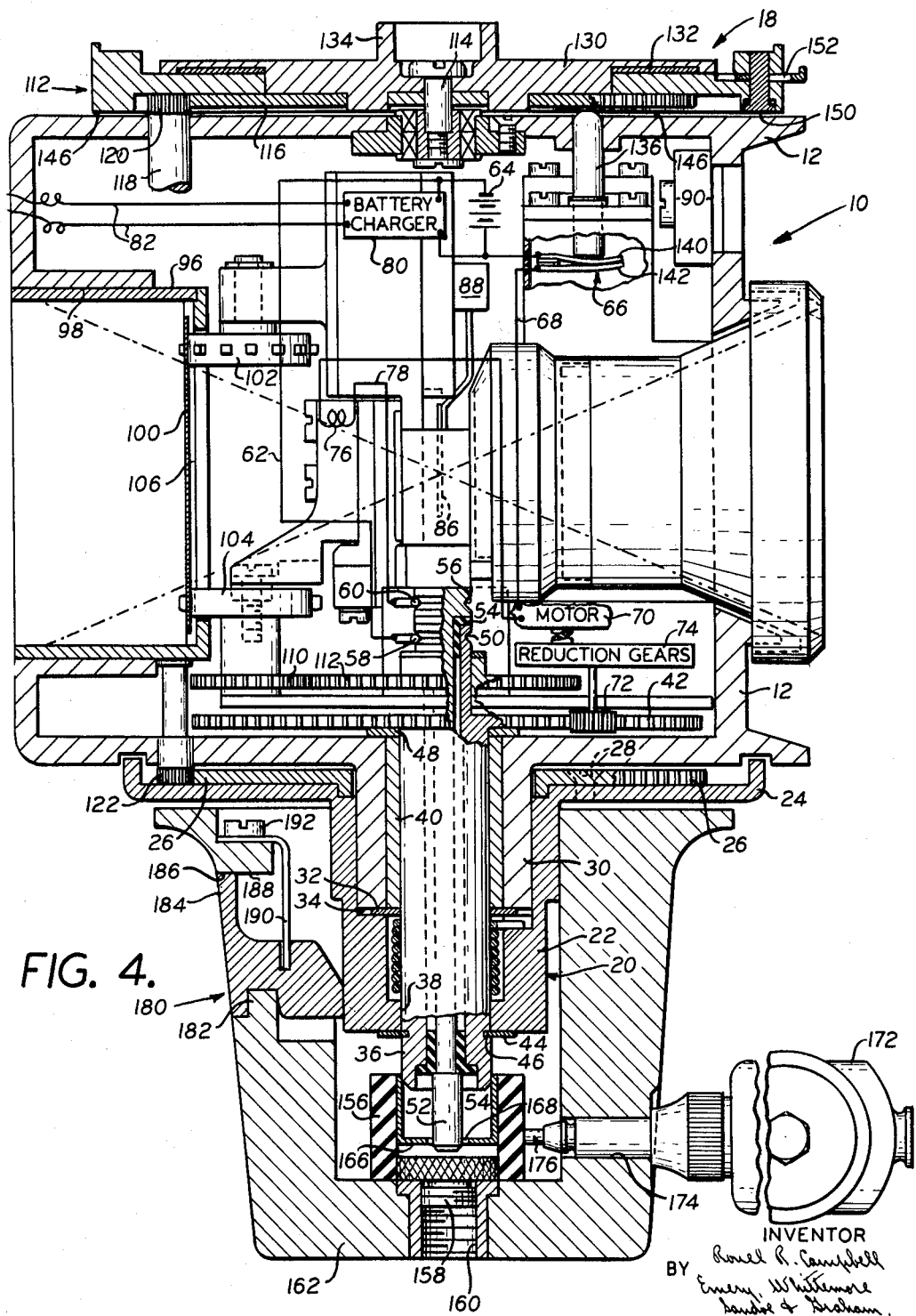
FIGURE 4 is a diagrammatic sectional view of the panoramic camera with a base having a self-timer actuator.

FIGURE 1 shows a panoramic camera 10 having a housing 12 with a recess 14 in the front face, and a lens 16 at the inner end of the recess. On top of the camera housing 10 there is an angle control mechanism 18 for determining the angle through which the camera swings to take a picture.

At the lower end of the camera housing 12 there is a support 20 extending from the housing. This support is stationary when the camera is rotating to take a panoramic picture.

The support 20 includes an outer shell 22 with a flange 24 at its upper end. There is a large gear 26 within the flange 24 and connected to the flange by screws 28 (FIG. 4) to form a unitary structure. The shell 22 surrounds a hub 30 extending downwardly from the housing 12 of the camera and the hub 13 is free to rotate in the outer shell 22. The lower end of the hub 30 rests on a thrust bearing 32 which is on a shoulder 34 of the shell 22.

There is a sleeve 36 extending through the outer shell 22. This sleeve fits through an opening 38 in the lower part of the outer shell 22, and the surface of this opening 38 serves as a bearing for the lower end portion of the sleeve 36. The upper part of the sleeve 36 turns in a bearing 40 held in the part 30 of the camera housing.

A gear 42 is secured to the upper end of the sleeve 36. A snap ring 44 in a circumferential groove 46 of the sleeve 36 prevents upward displacement of the sleeve 36 and there is a thrust washer 48 under the gear 42 for preventing downward displacement of the sleeve 36. The sleeve 36 extends upward beyond the gear 42 and has a groove 50 in its circumferential face near the upper end of the sleeve.

There is a shaft 52 which extends through the sleeve 36 and beyond both ends of the sleeve 36. This shaft 52 is electrically insulated from the sleeve 36 and from other portions of the camera by bushings 54 located in the upper and lower ends of the sleeve 36. These bushings 54 serve as bearings for the shaft 52. The upper end of the shaft 52 has a groove 56 in its circumferential face similar to the groove 50 of the sleeve 36. These grooves 50 and 56, and the adjacent circumferential surfaces of the sleeve 36 and shaft 52 serve as slit rings for electrical brushes 58 and 60.

The brush 58 connects with a conductor 62 that leads to the ground connection of a battery 64. The other side of the battery connects with a switch 66 for controlling the angle of movement of the camera when taking a panoramic picture. This switch 66 has a conductor 68 which connects the switch in series with an electric motor 70 that operates the camera to move it angularly when taking panoramic pictures.

The motor 70 drives a pinion 72 through reduction gears 74; and this pinion 72 meshes with the gear 42 at the upper end of the sleeve 36. Thus when the sleeve 36 is held stationary, the pinion 72 rolls around the circumference of the stationary gear 42.

A coil 76, connected in series with the motor 70 operates the shutter of the camera so as to open the shutter when the camera is moving angularly to take a panoramic picture. The other side of the coil 76 is connected by a conductor 78 to the brush 60 and thus the circuit is brought back to the shaft 52. In order to close the circuit through the motor 70 and shutter actuating coil 76, it is necessary, therefore, to have the switch 66 closed and to also close the circuit between the sleeve 36 and the shaft 52.

A battery charger 80 is connected across the battery 64 and this battery charger is supplied with power, when the battery is to be charged, through conductors 82 which lead to terminals on the outside of the camera housing.

Within the camera housing there is an iris diaphram 86 actuated by an electrical actuator 88 which is supplied with power from a photo cell 90. The actual construction of the shutter, the iris diaphram and its actuating mechanism and photo cell circuit are not illustrated because they form no part of the present invention. The film and film-moving mechanism also form no part of the present invention but parts which are shown in the drawing will be described briefly for better understanding of the construction of the camera housing generally.

The camera has a cassette 96 which fits into a holder 98 in the back wall of the camera housing. A film 100 moves from a spool on one side of the cassette to another spool on the other side, the spool structure and operating mechanisms for the wind-up spool are not illustrated.

There are film sprockets 102 and 104 which engage sprocket openings in the film 100; and there is a slot 106 through a front wall of the cassette for exposing the film 100.

The sprocket 104 is driven through gearing 110, 112, and other gearing not illustrated, from the motor 70 so as to cause the sprocket 104 to hold the film 100 stationary in space behind the slot 106 as the camera rotates about the longitudinal axis of the sleeve 36 and shaft 52.

There is a ring 112 at the top of the camera housing and this ring 112 is rotatable about a screw 114 attached to the top of the camera housing 12. A gear 116 is secured to the ring 112 and there is a shaft 118 with a pinion gear 120 at its upper end and another pinion gear 122 at its lower end. The upper pinion gear 120 meshes with the gear 116; and the lower pinion gear 122 meshes with the stationary gear 26. When the camera is moving angularly about its vertical axis, the lower pinion gear 112 rolls around the stationary gear 26 and the rotation of the shaft 118 and upper gear 120 with the lower pinion gear 122 causes the pinion gear 120 to hold the upper gear 116 stationary in space while the camera housing 12 rotates beneath the ring 112 and gear 116.

There is an index plate 130 extending over a portion of the ring 112 and this index plate is held down against the ring 112 by the head of the screw 114. A thrust bearing 132 is located between the index plate 130 and the ring 112. There is a hand grip 134, extending upwardly from the index plate 120 for turning the index plate about the vertical axis of the camera.

There is a rod 136 in the camera housing 12 for operating the switch 66. This switch 66 has an upper, movable contact 140 which is a spring and which urges the push rod 136 upwardly. Whenever push rod 136 is free to move upwardly, the spring contact 140 moves up and out of contact with a lower contact element 142 of the switch 66.

The push rod 136 contact with a bottom face 146 of the ring 112. This holds the push rod 136 in the depressed position as shown in FIGURE 4. There is a button 150 in the ring 112 and this button 150 has its bottom surface flush with the bottom face 146 when in the position shown in FIGURE 4. The button 150 is held in this position by a clip 152.

The clip 152 can slide horizontally and when it slides toward the left in FIGURE 4, it moves into a position which permits the button 150 to move upward.

When the button 150 is thus released by the clip 152, and the camera housing 12 rotates under the ring 112 until the push rod 136 comes under the button 150, then the spring 140 of switch 66 lifts the push rod 136 and the button 150 far enough to permit the switch 66 to open. This breaks the circuit of the motor 70 and causes the camera to stop its angular movement. Breaking of the motor circuit also breaks the circuit of the shutter coil 76 and thus closes the shutter of the camera.

Switch means for closing an electric circuit between the sleeve 36 and the shaft 52 includes a sleeve 156 made of rubber or other flexible material. This sleeve 156 is secured to a head of a screw 158 that threads into an opening 160 in the bottom of a base 162. The portion of the threaded opening 160 below the screw 158 can be used for receiving a screw of a tripod on which the base 162 can be mounted.

There is a metal cup 166 attached to the inside of the sleeve 156, and this metal cup 166 has an opening 168 through which the lower end of the shaft 52 extends. The opening 168 is slightly larger in diameter than the shaft 152, but whenever the sleeve 156 is displaced laterally, the edge of the cup 166 around the opening 168 touches the shaft 52. The upper end of the cup 166 bears against the sleeve 36 and whenever the edge of the opening 168 touches the shaft 52, therefore, an electric circuit is closed between the sleeve 36 and shaft 52 to start the motor 70 and to open the shutter of the camera if the push rod 36 is in a depressed position for closing the automatic stop switch 66. Thus the cup 166 comprises the movable element of a switch 170; and the shaft 52 comprises the fixed contact of the switch 170. This switch 170 is representative of a number of different kinds of switches that are used with the invention, as will be explained in connection with other figures of the drawing.

FIGURE 4 shows a self-timer 172 which screws into an opening 174 in the base 162. The timer has a push rod 176 which is thrust outward, that is, toward the left in FIGURE 4 at the end of the period for which the timer is set. This outward movement of the push rod 176 deflects the flexible sleeve 156 and moves the edge of the opening 168 of the cup 166 into contact with the shaft 52 to close the circuit, as previously described.

The outer shell 22 of the support 20 fits into the base 162 and is held in the base by a retainer 180 which is recessed to fit loosely over a ridge 182 of the base 162. The upper portion of the retainer comprises an extension 184 which is adjacent to a top surface 186 of an opening 188 provided in the side of the base 162 for receiving the retainer 180. There is a spring 190, connected with the base 162 by a screw 192; and this spring 190 urges the lower inner portion of the retainer 180 into contact with the outside surface of the shell 22. The length of surface contact of the retainer 180 with the shell 22 is short, and if there is any relative longitudinal movement of the base 162 and the shell 22, this causes the retainer 180 to jam against the side of the shell 22 and to prevent the removal of the shell from the base 162.

When it is desired to remove the camera from the base 162, the extending upper portion 184 of the retainer 180 is pushed inward to rock the retainer 180 on the ridge 182 and thus relieve the pressure and contact between the retainer 180 and the shell 22 so that the shell can be lifted out of the base 162.

FIGURE 1 shows a manual holder or pistol grip handle 194 having a socket at its upper end into which the support 20 extends. The support 20 is held in the pistol grip handle 194 by a retainer 180 which is similar in construction to that shown in FIGURE 4.

At the front of the handle 194 there is a trigger 198 which is located in a slot 199 in the front of the handle 194; and this trigger 198 is supported by a pivot 200 extending to both sides of the slot 199. The trigger 198 is urged to swing in a counter clockwise direction by a spring 202 located in the interior of the handle 194 and held in place by fastening means such as screw 204. The movement of the trigger 198 in a counter clockwise direction, is limited by a top face 206 of the trigger which abuts against the flange 24.

The trigger is moved in a clockwise direction by pressure applied to it by the index finger of the hand of an operator holding the piston grip 194. When this trigger 198 is pressed inwardly; that is, moved clockwise in FIGURE 1a, the spring 202 is flexed and is brought into position to simultaneously touch both the end of the shaft 52 and the outer edge of the bottom of the sleeve 36.

When the trigger 198 is in its normal position with its top face 206 in contact with the flange 24, the spring 202 has a clearance from the sleeve 36. Thus the spring 202 comprises the movable contact element of a switch for establishing a circuit between the shaft 52 and the sleeve 36 whenever the trigger 198 is pressed inwardly. This switch consisting of the shaft 52, spring 202, and sleeve 36 is another form of the switch 170 which has already been described in connection with FIGURE 4.

Closing of this circuit between the shaft 52 and sleeve 36 causes the panoramic camera to operate as has already been described in connection with FIGURE 4.

FIGURE 5 is a wiring diagram representative of the controls shown in all of the other figures. A switch 170' is representative of the switch of FIGURE 4 which includes the shaft 52, cup 166 and sleeve 36; the switch of FIGURE 1a comprising the shaft 52, spring 202 and sleeve 36; and a shunt circuit 210 which is closed by the remote control mechanism which will be described in connection with FIGURES 2 and 3.

FIGURE 2 shows the support 20 of the camera 10 placed in a socket 225 of a base 228. This base has a retainer 180 and spring 190 similar to the retainer and spring already described in connection with the base 162 of FIGURE 4. The base 128 is supported by feet 230 located at angularly spaced regions around a bottom 232.

The base 228 has switch mechanism in the lower part of the socket 225. This switch mechanism, indicated generally by the reference character 234 includes a block 236 of electrical insulation attached within the socket 225 by fastening means such as screws 238. There is a cup 240 formed at the upper end of the block 236; and there is a rod 242 extending through the upper part of the block 236 with the axis of the rod 242 substantially coincident with the axis of the cup 240. A flange 246 at the upper end of the rod 242 bears against the lower end of the shaft 52. There is a spring 248 in the cup under the flange 246 for holding the flange in contact with the shaft 52.

Although the rod 242 can slide through the opening in the block 236 when the support 20 is initially inserted into the socket 225, the rod 242 remains in a fixed position after the camera 10 has been mounted on the base 228.

The switch mechanism 234 also includes a contact 252 which serves as a fixed contact after the camera 10 and base 228 have been assembled. This contact 252 is connected to the rod 242.

There is also a movable contact 254 located within the block 252 and this movable contact 254 is connected through a conductor 256, connector 258, and spring 260 to the sleeve 36 or the outer shell 22 which is in electrical contact with the sleeve 36.

A relay coil 264 is mounted in the block 236 under the movable contact 254 and in position to pull the contact 254 downward into position to touch the lower contact 252 whenever the coil 236 is energized. A movable contact 254 has a bias toward its raised or open position. Thus energizing of the relay coil 264 causes the switch mechanism 234 to close the circuit between the shaft 52 and the shell 36 to start the camera motor and to open the shutter, as previously explained.

Within the base 228 there is a sound responsive actuator indicated generally by the reference character 270 and a radiant energy actuator indicated generally by the reference character 272.

The sound responsive actuator 270 includes a transmitter 274 which receives sound through an open grille work 276 in a side wall of the base 228. This transmitter is coupled through a filter 278 to an amplifier 280 which supplies electric current to the coil of relay 264 whenever the transmitter 274 receives energy of the frequency for which the filter 278 is tuned.

The radiant energy responsive actuator 272 includes an antenna 284 connected to a detector unit 286 which supplies a signal to the amplifier 280 which in turn supplies current to the relay coil 264 to operate the switch mechanism 234 and close the circuit to the camera. The radiant energy responsive actuator 272 is preferably a radio receiver with an adjustment 290 for changing the tuning of the receiver.

FIGURE 3 shows the camera 10 attached to a base 228' which is the same as the base 228 shown in FIGURE 2, but the actuating mechanism in the base 228' includes only the radio receiver 286, the switch mechanism 234 and the amplifier 280. There is no sound responsive actuator in the base 228'. It will be understood that the base can also be equipped with a sound responsive actuator or a radiant energy responsive actuator or a combination of both and other remote control means, it is a feature of the invention that the base has a socket into which the support 20 of the camera can be inserted so that the camera can be used interchangeably with any of these bases depending upon the type of control which is desired at any particular time.

The preferred embodiments of the invention have been illustrated and described, but changes and modifications can be made and some features can be used in different combinations without departing from the invention as defined in the claims.

What is claimed is:

1. A panoramic camera including a housing, a support connected to the housing and on which the housing is rotatable about a substantially vertical axis, a base having a detachable telescoping connection by which the base is detachably connected to the support, an electric motor in the housing for rotating the housing on said support, an electric switch in the base, contacts on the support that cooperate with the switch means and that have conductors insulated from one another and leading upward into the housing and to an electric circuit for controlling the motor, brush means in the housing and connecting the motor circuit with said conductors and actuating means on the base for operating electric switch means in the base.

2. The camera described in claim 1 characterized by the actuating means on the base including switch operating means having a detector for wave energy from without the base, and an amplifier for increasing the power of the said wave energy to operate the switch.

3. The camera described in claim 2 characterized by an electric circuit responsive to a limited frequency range for limiting the operation of the switch to wave energy within a predetermined frequency range.

4. The camera described in claim 1 characterized by other switch means in the housing with automatic operating means that operate that other switch means in accordance with the angle of rotation of the housing on the said support, the switch in the base and the switch means in the housing being correlated in the motor circuit so that operation of the motor started by the switch in the base is stopped by the operation of the switch means in the housing.

5. The camera described in claim 4 characterized by said other switch means being adjustable to operate in response to different angles of movement of the housing on said support.

6. The camera described in claim 1 characterized by the camera having a shutter in the housing and electromagnetic means for operating the shutter, both the motor and the shutter being operated by the switch in the base to which the support is connected.

7. The panoramic camera described in claim 1 characterized by said conductors extending downward and being close together at their lower ends, at least one of the conductors having its lower end displaceable into contact with the other of said conductors whereby the lower ends of the conductors constitute the switch means.

8. Photographs apparatus including a camera for holding a roll of film, a lens system for exposing the film, a partition adjacent to the focal plane of the lens system with an opening therethrough for exposing that portion of the film behind said opening, the camera having an element on which the rest of the camera including the lens system and the partition are rotatable about a vertical axis, driving mechanism in the camera for moving it about said vertical axis and for moving the film with respect to the camera as the camera rotates so as to make a panoramic exposure greater than the width of the opening in the partition, a support for said element on the lower part of the camera, a base in which the support is removably held and for mounting the camera at a fixed location during part of the exposure of the film, a manual grip in which the support is removably held when removed from the base and for manually and movably supporting the camera during another part of the exposure of the film, actuating means on the base, other actuating means on the handle grip, and control means on the support for starting and stopping the driving mechanism, said control means being on the support below said element on which the camera rotates in position for operative connection with the actuating means on the base and on the handle grip when the support is held by the base and the handle grip, respectively.

9. A camera comprising a housing having a lens and means for carrying light responsive means behind the lens in position to be exposed to light entering the housing through said lens, a shutter for controlling the passage of light into the housing, a support for the housing extending downwardly therefrom, a base under the support, fastening means connecting the support to the base, a switch in the base, and connections between the switch in the base and the shutter for controlling the operation of the shutter from the base, the support having a quill construction in which the support has two elements, one of which is enclosed within the other, the enclosed element being longer and extending below the lower end of the other element, and the different elements of the support connect with different sides of the switch in the base.

References Cited by the Examiner
UNITED STATES PATENTS

| | | | |
|---|---|---|---|
| 1,209,636 | 12/1916 | Berger | 317—123 |
| 1,449,295 | 3/1923 | Richards | 95—15 |
| 2,402,965 | 7/1946 | Hornberger | 95—15 |
| 2,485,119 | 10/1949 | Steiner | 95—125 |
| 2,909,096 | 10/1959 | Barnett | 352—191 |
| 3,099,946 | 8/1963 | Burton | 95—16 |

JOHN M. HORAN, *Primary Examiner.*

NORTON ANSHER, *Examiner.*